United States Patent [19]
Ishii et al.

[11] Patent Number: 5,533,247
[45] Date of Patent: Jul. 9, 1996

[54] METHOD FOR FABRICATING A LEAD SCREW MADE OF SYNTHETIC RESIN MATERIAL AND HAVING A CORE TUBE THEREIN

[75] Inventors: Kiyoshi Ishii, Tokyo; Mizuho Ishikawa, Kanagawa-ken, both of Japan

[73] Assignees: Kabushiki Kaisha Mold Gijutsu Kenkyusho; Minebea Co., Ltd., both of Japan

[21] Appl. No.: 305,562

[22] Filed: Sep. 14, 1994

[30] Foreign Application Priority Data

Sep. 17, 1993 [JP] Japan .................................... 265346

[51] Int. Cl.⁶ .................................................. B23P 17/00
[52] U.S. Cl. ........................... 29/527.4; 29/530; 264/273
[58] Field of Search .............................. 29/527.2, 527.4, 29/530; 264/271.1, 273, 274, 279; 411/411, 424, 908

[56] References Cited

U.S. PATENT DOCUMENTS 4,988,472 1/1991 Orimoto et al. ..................... 264/274

FOREIGN PATENT DOCUMENTS 2-113910 4/1990 Japan .

*Primary Examiner*—David P. Bryant
*Attorney, Agent, or Firm*—Marshall & Melhorn

[57] ABSTRACT

To reduce the need for manual work, improve productivity and reduce the fabrication cost in the method for molding a lead screw for converting a rotational movement into a linear movement, there are provided a method and a die assembly which may involve the steps of forming a plurality of holes in a wall of a tube in a spiral arrangement, preparing a metallic die assembly provided with a cavity defining a thread groove adapted to form the thread crest matching in position with an array of the holes, placing the tube in the cavity, and injecting synthetic resin material into the cavity so that the synthetic resin material may flow in two separate flows, one flowing inside the core tube, and the other flowing along the outer surface of the core tube. The thread crest is connected to the synthetic resin material filled in the core tube, and can be securely attached to the core tube. Optionally, an annular rotor may be fitted onto the base end portion of the lead screw. The synthetic resin material is first filled into the annular gap defined around the annular rotor before it is filled into the interior of the annular rotor so that the rotor may be prevented from being damaged by the tensile stress produced by internal pressure acting on the annular rotor.

10 Claims, 9 Drawing Sheets

METHOD FOR FABRICATING A LEAD SCREW MADE OF SYNTHETIC RESIN MATERIAL AND HAVING A CORE TUBE THEREIN

TECHNICAL FIELD

The present invention relates to a method for molding a lead screw with a core tube placed therein, and in particular to a method for fabricating such a lead screw in which the synthetic resin material forming the thread crest is firmly attached to the core tube, and a die assembly for fabricating such a lead screw. The present invention also relates to a method for integrally molding a lead screw having a core tube therein and integrally provided with a rotor for an electric motor at a base end portion thereof, and a die assembly for fabricating such a lead screw.

The lead screw fabricated by the method of the present invention is particularly, but not exclusively, suitable for use in mass data storage devices such as flexible disk drives, hard disk drives, and optical disk drives for moving a magnetic or optical head in radial direction by converting the rotational movement of an electric motor into a linear movement of the magnetic or optical head.

BACKGROUND OF THE INVENTION

Conventionally, such a lead screw used to be made by machining a screw thread in a metallic rod made of such materials as bronze and stainless steel. A lead screw made of such material has a high dimensional precision and is durable, but is relatively expensive to manufacture because of the various machining steps involved. Furthermore, there is a substantial difficulty in improving the efficiency of fabricating such lead screws, and the cost of each lead screw is therefore unacceptably expensive. In some applications, generation of metal powder is desired to be avoided, and the use of synthetic resin material may be preferred.

There have been attempts to produce lead screws by molding synthetic resin material, but such attempts have encountered the following problems.

Synthetic resin material can be readily molded into a desired shape, but tends to involve shrinking and cracking as well known in the art, and may warp and otherwise deform in time depending on the environment. Therefore, synthetic resin material cannot provide sufficient reliability and precision that are required in lead screws for converting a rotational movement into a linear movement.

In view of such problems, it has been proposed to mold a desired screw thread on the outer wall of a metallic tube with synthetic resin material, but because the attachment between the screw thread and the metallic tube cannot be made strong enough to entirely prevent the separation between the tube and the screw thread as required for the lead screw to perform its function, this proposal has never achieved any commercial success.

The inventor has therefore previously proposed a method for molding a lead screw comprising the steps of forming a plurality of holes in a wall of tube made of metal or the like at portions matched in position with a thread crest of a prescribed screw thread at a desired interval, preparing a metallic die assembly having a cavity provided with a thread groove corresponding to an array of holes provided in the metallic tube, placing the metallic tube in the cavity of the metallic die assembly with the array of holes of the metallic tube matched in position with the thread groove, and injecting resin material axially into the metallic tube (Japanese patent laid open (kokai) publication No. 2-113910). The synthetic resin material is filled into the tube and emerges from the holes to be filled into the thread groove of the cavity. Thus, the screw thread formed on the tube is connected to the portion of the material filled in the tube via the holes provided in the wall of the tube, and the thread can be securely attached to the tube.

However, it was discovered that the method for making a lead screw proposed in this Japanese patent publication involves certain difficulties in the design of the injection gate for synthetic resin material. More specifically, the synthetic resin must be injected into the tube with a sufficient pressure to allow the synthetic resin to flow through the holes provided in the tube, and the time period required for each molding process is therefore comparatively long. The molding process may be speeded up by increasing the number of the holes and/or the diameter of each hole, but it will reduce the mechanical strength of the tube.

Because such a lead screw is required to be connected to an electric motor, it is desirable to have the lead screw to be integrally incorporated with a motor rotor. However, when an attempt is made to integrally mold a rotor with a lead screw, because the rotor is typically made of an annular permanent magnet piece made of ferrite and other brittle material, the injected synthetic resin material may cause such a large internal pressure on the rotor that it may crack or is otherwise damaged under the pressure.

BRIEF SUMMARY OF THE INVENTION

In view of such problems of the prior art, a primary object of the present invention is to provide a method for fabricating a lead screw by molding thread crest around a core tube having a required mechanical strength which can be carried out, economically, quickly and with a reduced possibility of producing defective products.

A second object of the present invention is to provide a method for fabricating a lead screw which can ensure a high mechanical strength, and is highly durable in use.

A third object of the present invention is to provide a method for fabricating a lead screw which can ensure a high dimensional precision.

A fourth object of the present invention is to provide a method for fabricating a lead screw having an annular rotor member integrally fitted on a base end thereof which can be carried out, economically, quickly and with a reduced possibility of damaging the rotor member during the molding process.

A fifth object of the present invention is to provide a die assembly which can be used for conveniently carrying out these methods.

These and other objects of the present invention can be accomplished by providing a method for molding a lead screw comprising the steps of: forming a plurality of holes in a wall of a core tube made of metal or the like having a required mechanical strength at portions matching in position with a thread crest of a prescribed screw thread; preparing a die assembly provided with a cavity including a thread groove formed in a die surface thereof adapted to form the thread crest matching in position with the array of holes formed in the core tube; placing the core tube in the cavity of the die assembly with the array of holes of the core tube matched in position with the thread groove of the cavity; injecting synthetic resin material axially into an internal bore of the core tube as a first flow and into an annular gap defined between an outer circumferential surface of the core tube and an opposing die surface of the cavity as a second flow; and removing the thus molded lead screw out of the die assembly.

Thus, the synthetic resin material is injected into the cavity in two separate flows which meet with each other in a suitable location in the cavity, and can quickly fill up the entire cavity. Because the thread crest is rooted in the synthetic resin material filled in the internal bore of the core tube via the holes formed in the wall of the core tube, the thread crest can be securely attached to the core tube. The core tube can be made of metal and other suitable material, and can ensure a sufficient mechanical strength to the lead screw against bending and other stresses, and a high dimensional precision.

In particular, by distributing the synthetic resin material between the first flow directed axially into the internal bore of the core tube and the second flow directed axially along outer circumferential surface of the core tube in such a manner that the first and second flows meet with each other substantially inside the internal bore of the core tube, the meeting lines between these two flows may be contained in the internal bore of the core tube, and can avoid such lines from appearing in the thread crest. Such meeting lines are obviously undesirable in appearance, and may create a weak spot if the molding process is not appropriately carried out. However, if such meeting lines are contained inside the internal bore of the core tube, they not only remain hidden from view but would not substantially affect the mechanical strength of the thread crest.

Because the thread crest is made of synthetic resin material, it will not produce any metal powder during use, and can provide a favorable frictional property, and a high wear resistance. The part of the lead screw located between adjacent sections of the thread crest may be defined by the outer surface of the core tube. This embodiment may be desirable when the weight and size of the lead screw are desired to be minimized for a given mechanical strength. Alternatively, the part of the lead screw located between adjacent sections of the thread crest may be covered by a layer of synthetic resin material. This embodiment may be desirable if a favorable electric insulation and rust prevention of the core tube are desired.

The produced lead screw may be removed by turning the molded lead screw relative to the die assembly around its axial line in a direction to unthread the lead screw out of the cavity. Thus, the cavity may be defined by a cylindrical bore formed in the die member without dividing it by a longitudinal parting plane passing through the central axial line of the cavity.

Such a molding process can be conveniently carried out by using a die assembly for molding a lead screw around a core tube having a required mechanical strength and provided with holes at portions matching in position with a thread crest of a prescribed screw thread, comprising: a die member defining a substantially cylindrical cavity including a thread groove formed in a die surface thereof; means for coaxially positioning the core tube in the cavity; gate means for injecting synthetic resin material both into an internal bore of the core tube, and into an annular gap defined between an outer circumferential surface of the core tube and an opposing die surface; and means for opening the die assembly to allow a molded lead screw to be removed.

A base end portion of the lead screw may be integrally incorporated with an annular rotor member by preparing a die assembly provided with a first cavity including a thread groove formed in a die surface thereof adapted to form the thread crest matching in position with the array of holes formed in the core tube, and a second cavity for integrally molding an annular rotor on a based end portion of the core tube, the first and second cavities being arranged in a coaxial relationship, and communicated with each other; placing the core tube in the first and second cavities with the annular rotor placed in the second cavity so as to surround the base end portion of the core tube with a certain gap defined between the annular rotor and the core tube; and injecting synthetic resin material axially into an internal bore of the core tube as a first flow and into a first annular gap defined between an outer circumferential surface of the rotor and an opposing die surface of the die assembly, and a second annular gap defined between the outer surface of core tube and the inner surface of the rotor as a second flow, the second flow of the synthetic resin material flowing into the second annular gap being controlled in such a manner that the pressure of the synthetic resin material filled into the first annular gap is substantially dominant over that filled into the second annular gap.

Such a method can be conveniently carried out by using a die assembly for molding a lead screw around a core tube having a required mechanical strength and provided with holes at portions matching in position with a thread crest of a prescribed screw thread, and integrally molding an annular rotor member onto a base end portion of the lead screw, comprising: a die member defining a substantially cylindrical first cavity including a thread groove formed in a die surface thereof, and a substantially cylindrical second cavity for receiving the rotor member fitted coaxially onto the core tube, the first and second cavities being disposed coaxially with each other, and in mutual communication; means for coaxially positioning the core tube in the first and second cavities; means for coaxially positioning the rotor member, as fitted on the core tube, in the second cavity; gate means for injecting synthetic resin material into an internal bore of the core tube, a first annular gap defined between an outer surface of the rotor member and an opposing die surface, and a second annular gap defined between an outer surface of the core tube and an inner surface of the rotor member, the flow of the synthetic resin material filled inside the second gap being controlled in such a manner that the pressure of the synthetic resin material filled into the first annular gap is substantially dominant over that filled into the second annular gap; and means for opening the die assembly to allow a molded lead screw to be removed.

The rotor member normally consists of an annular permanent magnet member typically consisting of highly brittle materials such as ferrite, and can be easily damaged when subjected to tensile stress. According to the present invention, the injected synthetic resin material first applies external pressure around the rotor member before it is filled into the interior of the core member. Therefore, the rotor member is not subjected to any excessive tensile stress from internal pressure acting on its inner circumferential surface, and would not be damaged during the molding process.

Such a distribution of synthetic resin material between the first and second annular gaps can be accomplished in a number of ways. For instance, the gate means may include a central inlet for filling synthetic resin material into the internal bore of the core tube from an axial end thereof, and an outer inlet arranged around the central inlet for filling synthetic resin material into the first annular gap defined between the rotor and the opposing die surface, from a same axial end as the central inlet, the second cavity being provided with a communication passage communicating the first annular gap with the second annular gap at an end of the second cavity remote from the outer inlet. Alternatively, the gate means may include a central inlet for filling synthetic resin material into the internal bore of the core tube from an axial end thereof, and a passage defined in the die member for introducing part of the synthetic resin material into the first and second annular gaps via first and second orifices, respectively, the first and second orifices being dimensioned in such a manner that the pressure of the synthetic resin material filled into the first annular gap is substantially dominant over that filled into the second annular gap.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
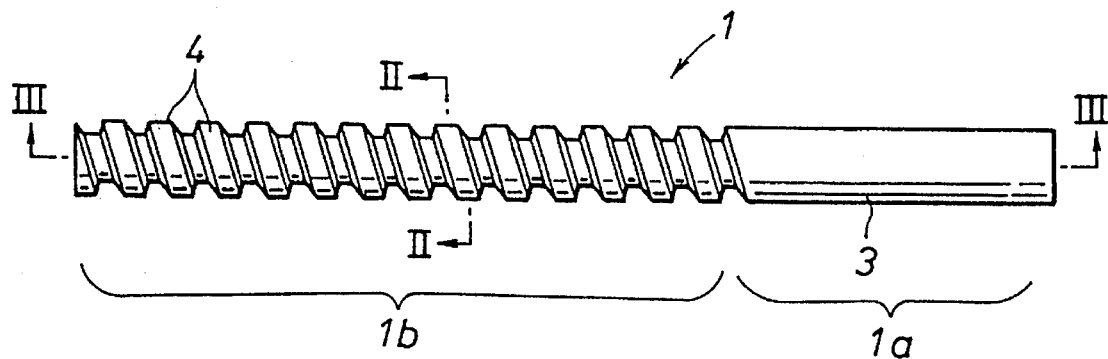
FIG. 1 is a side view of a lead screw fabricated by the method of the present invention.
Figure 2:
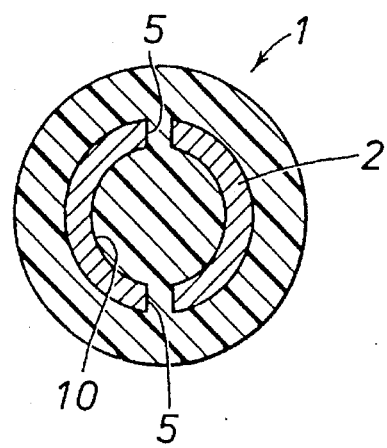
FIG. 2 is an end view of the lead screw as seen from the direction indicated by arrow II of FIG. 1.
Figure 3:
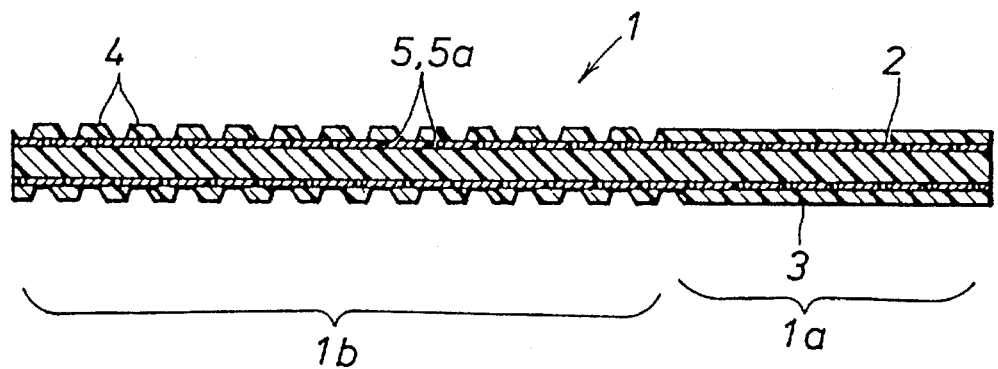
FIG. 3 is a sectional view taken along line III—III of FIG. 1.
Figure 4:
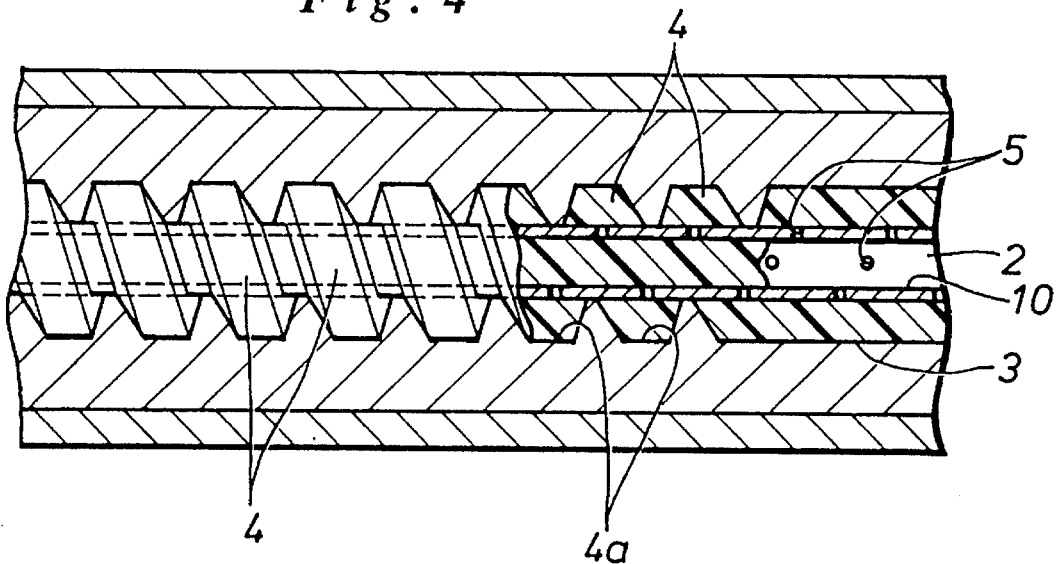
FIG. 4 is a fragmentary enlarged sectional view of a part of FIG. 1.

FIGS. 1 through 3 generally illustrate a lead screw 1 fabricated according to a first embodiment of the present invention. FIG. 4 shows a part of the lead screw 1 and the associated part of the molding die assembly 23 in more detail. This lead screw 1 is provided with a core tube 2, and synthetic resin material covers the exterior of the tube 2 and the internal bore 10 of the tube 2. This synthetic resin material may consist of any arbitrary synthetic resin material as long as it is suitable for injection molding, and provides a sufficient mechanical strength. More specifically, this lead screw 1 consists of a base end portion 1a having a generally smooth cylindrical surface 3, and a free end portion 1b provided with a screw thread. In this case, the thread crest 4 of this screw thread consists of a substantially planar and smooth surface which lies on a common cylindrical surface as the outer circumferential surface 3 of the base end portion 1a.

The core tube 2 may be made of stainless steel, for instance made by spiral forming a strip of stainless steel plate into a tubular shape. The tube may also be made of other materials such as metals and alloys of other kinds, natural and synthetic fibers and ceramics which provide sufficient mechanical strength and dimensional stability. The tube wall is provided with an array 5a of holes 5 in a spiral arrangement which correspond in position to the thread crest 4. The number of the holes 5 may be selected according to the property of the synthetic resin material and other design considerations, but one to four holes may be formed for each turn of the spiral. These holes 5 connect the synthetic resin material on the exterior of the core tube 2 to that in the interior of the core tube 2.

Figure 5:
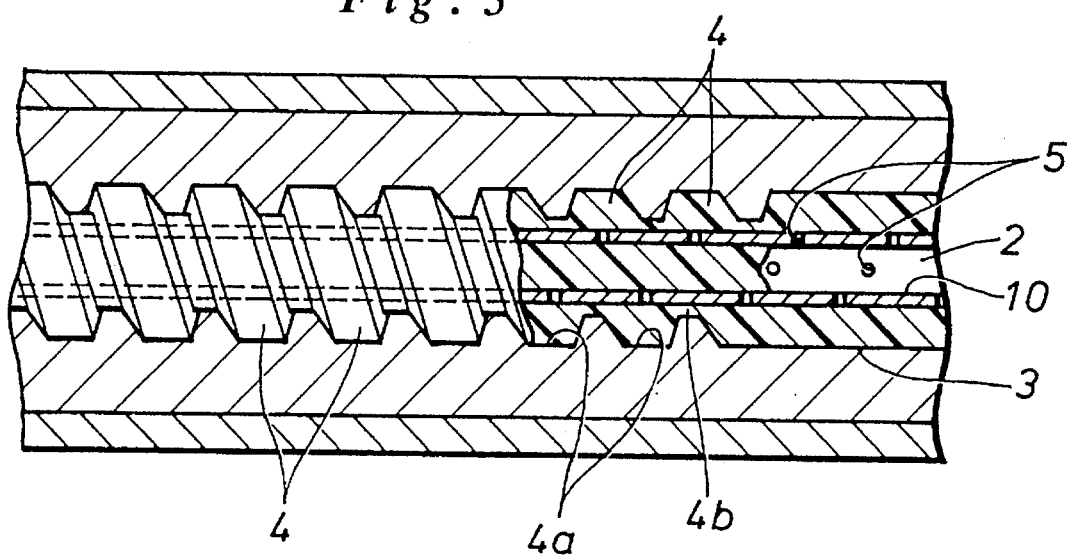
FIG. 5 is a view similar to FIG. 4 showing a embodiment slightly modified from that of FIG. 4.

FIG. 5 shows a different embodiment of the lead screw according to the present invention. In the lead screw illustrated in FIGS. 1 through 4, the thread root located between each run of the thread crest 4 was directly defined by the outer circumferential surface of the core tube 2. In other words, part of the core tube 2 was exposed. However, in the embodiment illustrated in FIG. 5, the thread root is also covered by a layer of synthetic resin material 4b, and the outer surface of the core tube 2 is thus totally covered by the synthetic resin material. This embodiment provides additional advantages such as better electric insulation, and reduction in the noise level when the lead screw meshes with a female thread member.

Figure 6:
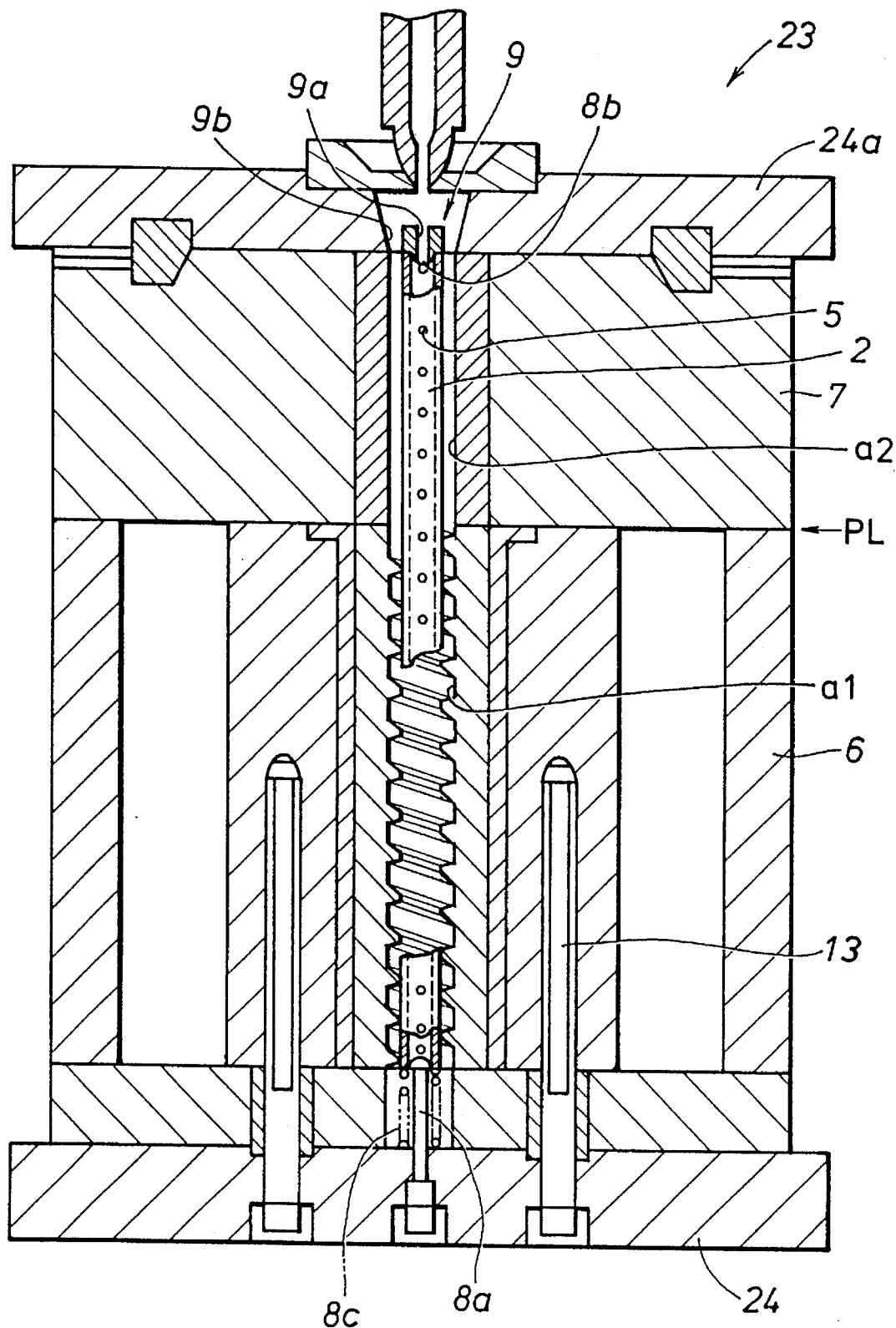
FIG. 6 is a sectional view of an essential part of the molding die assembly for carrying out the method of the present invention.

FIG. 6 illustrates the die assembly 23 which may be used for molding the lead screw illustrated in FIGS. 1 through 4. The die assembly 23 comprises an upper die 7 supported by a die plate 24a and a lower die 6 supported by a die plate 24, the upper and lower dies 7 and 6 are separated by a horizontal parting line PL. The lower die 6 is provided with a substantially cylindrical cavity a1 for molding the free end portion 1b of the lead screw 1, and the cavity a1 includes a thread groove 4a to mold the thread crest 4 associated in position with the array of holes 5a. The upper die 7 is provided with a substantially cylindrical cavity a2 which defines a substantially annular gap in cooperation with the core tube 2 for molding the base end portion 1a of the lead screw 1. The width of the annular gap in this case is substantially equal to the height of the thread crest 4.

When the upper and lower dies 7 and 6 are combined, the two cavities a1 and a2 are disposed coaxially to each other, and communicate with each other. In doing so, the free end portion of the tube 2 is fitted into the lower cavity a1 of the lower die 6 until the lower end of the tube 2 is properly positioned by a locating pin 8a or an appropriate ejector provided at a lower end of the lower die 6, and the array of holes 5a formed in the wall of the tube 2 are registered or matched in position with the thread groove 4a of the lower cavity a1. The base end portion of the tube 2 is likewise fitted into the upper cavity a2 of the upper die 7 until the upper end of the tube 2 is positioned by an upper locating pin 8b. Furthermore, a compression coil spring 8c surrounding the locating pin 8a urges the core tube 2 upwards. Thus, the core tube 2 is securely placed in the cavity of the die assembly in a coaxial relationship. FIG. 6 illustrates the condition of the die assembly at this time point, or after the core tube 2 is inserted in the cavity of the die assembly 23, and the die assembly is closed.

Then, synthetic resin material is injected from a gate 9 located at an upper open end of the upper cavity a2 surrounding the core tube 2 so as to cause the synthetic resin material introduced from the gate 9 to flow into the upper cavity a2 and then into the lower cavity a1. The gate 9 is provided with a central inlet 9a and an annular inlet 9b coaxially surrounding the central inlet 9a. The synthetic resin material injected from the central inlet 9a of the gate 9 is filled into the inner bore 10 of the tube 2 while the synthetic resin material injected from the annular inlet 9b flows along the outer surface of the core tube 2.

When the synthetic resin material is thus introduced from the two inlets 9a and 9b of the gate 9 as two different flows, these two flows will eventually meet with each other as the cavity of the die assembly is completely filled up by the synthetic resin material. If the flow from the central inlet 9a of the gate 9 is dominant over that from the annular inlet 9b of the gate 9, the two flows will meet with each other in the lower cavity a1 on the exterior of the core tube 2. Conversely, if the flow from the annular inlet 9b of the gate 9 is dominant over that from the central inlet 9a of the gate 9, the two flows will meet with each other in the lower cavity a1 in the interior of the core tube 2. In either case, the two flows will mix with each other in such a manner that the synthetic resin material on the exterior of the core tube 2 is integrally joined with that in the interior of the core tube 2 via the holes 5 provided in the wall of the core tube 2. Therefore, the thread crest 4 formed on the exterior of the core tube 2 is firmly rooted in the synthetic resin material inside the core tube 2, and is thereby securely attached to the core tube 2.

Preferably, the flow of the synthetic resin material from the annular inlet 9b of the gate 9 should be dominant over that from the central inlet 9a of the gate 9. The region where the two flows meet with each other may present minor parting lines or meeting lines which may create a weak portion, or at least may cause such a concern. Therefore, by allowing the two flows to meet with each other inside the core tube 2, the creation of a weak portion or parting lines in the thread crest 4 can be avoided.

When the synthetic resin material is injected into the cavity, and the desired lead screw is thus molded, the upper and lower dies 6 and 7 are separated from each other, and the molded lead screw 1 is removed from the die cavity. In this case, the lead screw 1 may be removed by holding the base end portion 1a of the lead screw 1 with a robot arm or other suitable means, and pulling the lead screw 1 upward while turning it so as to unthread it out of the lower cavity a1 of the lower die 6. Instead of pulling the lead screw by its base end portion, the lead screw 1 may also be pushed upward out of the lower cavity a1 of the lower die 6 by pushing its free end. Alternatively, by using a suitable actuating unit 13, the lower die 6 may be turned appropriately while the lead screw 1 is pulled or pushed upward by holding its base end portion or by pushing its free end portion as the case may be.

If the outer surface of the core tube 2 between adjacent sections of the thread crest 4 is desired to be covered by a layer of synthetic resin material as illustrated in FIG. 5, the part of the lower cavity a1 located between adjacent sections of the thread grooves 4a should be so dimensioned as to define a gap with respect to the outer circumferential surface of the core tube 2.

Figure 7:
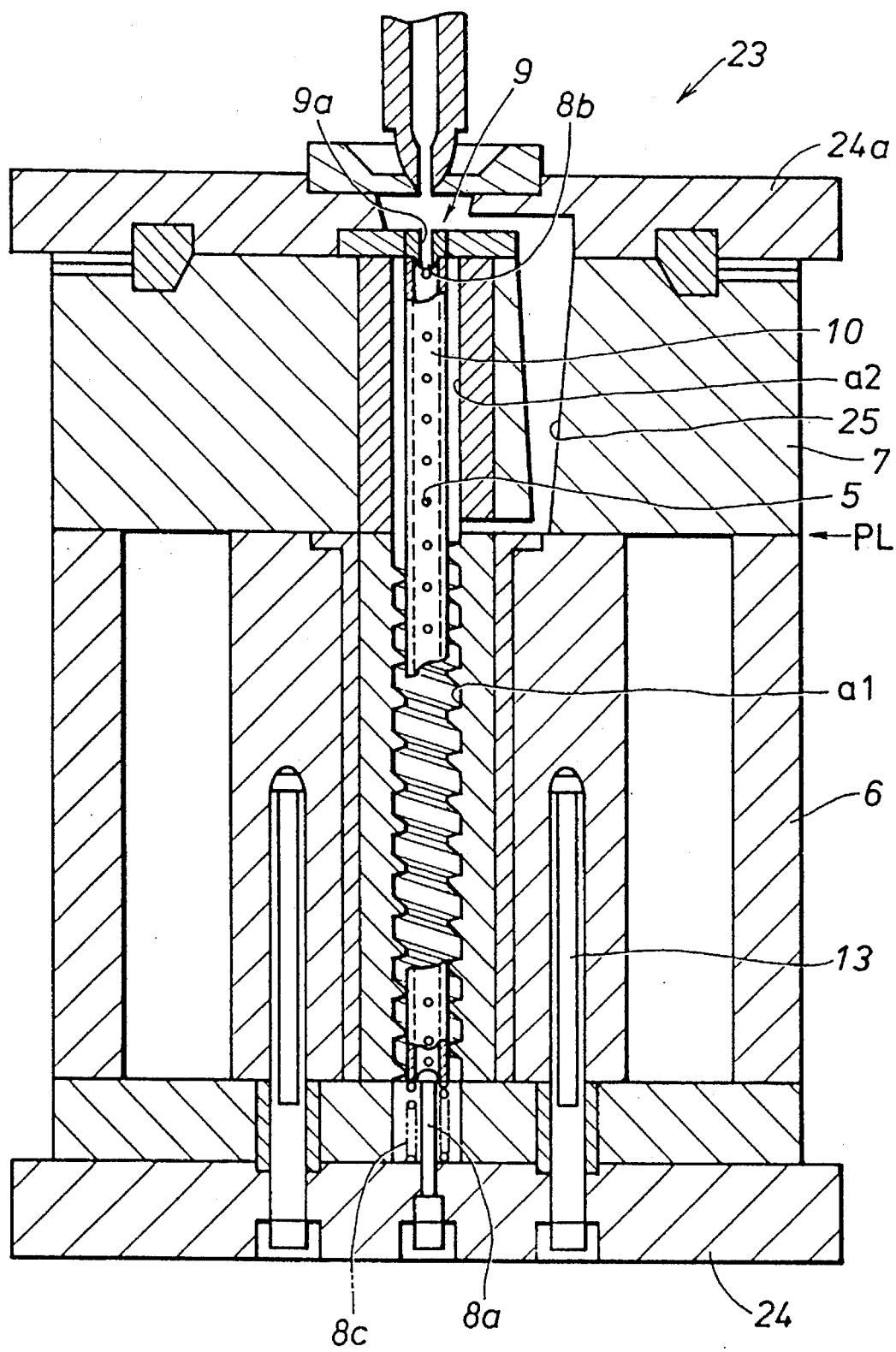
FIG. 7 is a view similar to FIG. 6 showing a embodiment slightly modified from that of FIG. 6.

FIG. 7 shows another embodiment of the die assembly 23. In FIG. 7, the parts corresponding to those in FIG. 5 are denoted with like numerals. In this embodiment, the gate 9 provided at the upper end of the upper cavity a2 is provided only with a central inlet 9a which is intended for injecting synthetic resin material into the interior of the core tube 2. The upper die 7 is additionally provided with a passage 25 extending from the gate 9 to the lower end of the upper cavity a2. Thus, part of the injected synthetic resin is conducted by the passage 25, and is filled into the gap defined between the core tube 2 and the die surface from an axially intermediate part of the lead screw 1. This gap extends into both the upper cavity a2 and the lower cavity a1, and the synthetic resin material can thus flow into both the cavities a1 and a2 of the lower and upper dies 6 and 7.

In both of these embodiments, the distribution of the synthetic resin material between the two flows should be appropriately selected by changing the dimensions of the inlets (orifices) and/or the passages so that the two flows may meet is a desired region.

It is possible to form the upper die 7 from two or more parts provided with angular pins and equip the lower die 6 with a suitable actuating mechanism 13 so that the molded lead screw 1 formed with the thread crest 4 may be automatically ejected from the die assembly by actuating an ejector functionally coupled to the actuating mechanism 13 (although it is not shown in the drawings).

The diameter of the holes 5 formed in the wall of the tube 2 may depend on the viscosity of the synthetic resin material, the injection pressure and the temperature of the die assembly, but is preferably in the range of one tenth to two tenths of the diameter of the tube in most cases.

The array of holes 5a can be formed in the stainless steel tube by turning and stopping the tube at a regular interval with a suitable indexing mechanism, and actuating a shutter mechanism for selectively directing a laser beam onto the tube during each stationary period. It is also possible to form the array of holes 5a at a regular interval by repeating the steps of moving the tube in the axial direction instead of turning it to form holes along an axial line, and turning the tube by a prescribed angle to form holes along a different axial line so that the array of holes 5a may be formed in a spiral arrangement, and correspond to the thread crest 4.

It is also possible to vary the thickness of the tube made of a single material or a composite material from one place to another so as to minimize the weight of the tube.

Figure 8:
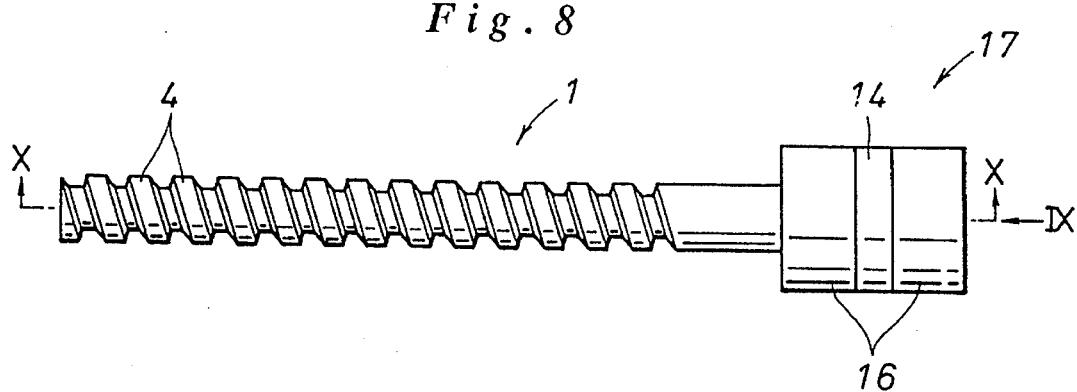
FIG. 8 is a view similar to FIG. 1 showing a lead screw integrally incorporated with a rotor and fabricated by the method according to the present invention.
Figure 9:
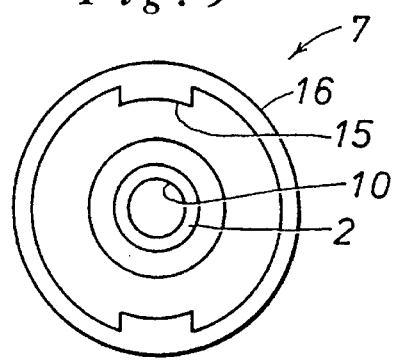
FIG. 9 is an end view of the lead screw as seen from the direction indicated by arrow XI of FIG. 8.
Figure 10:
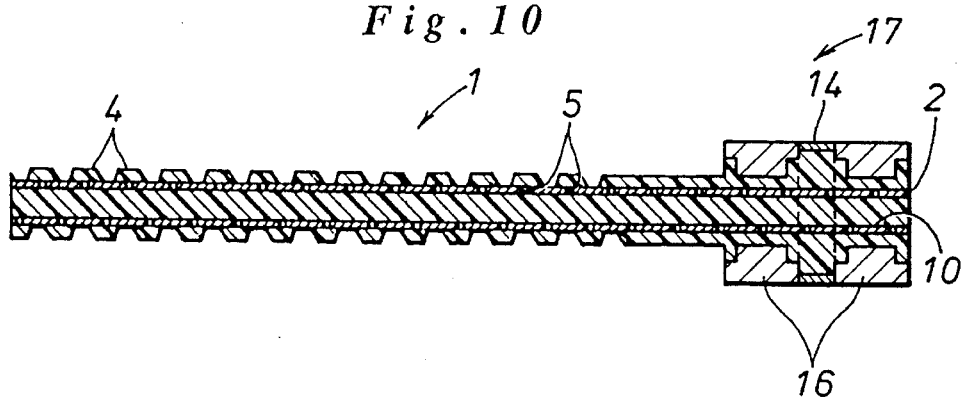
FIG. 10 is a sectional view taken along line X—X of FIG. 8.

FIGS. 8 through 10 illustrate a lead screw 1 integrally provided with a motor rotor 17. In this case, the rotor 17 is integrally fitted onto the base end of the lead screw 1, and comprises a ring 14 made of aluminum or the like is fitted onto an end of this tube 2, and a pair of annular permanent magnet members 16 are likewise fitted onto the tube 2 on either side of the aluminum ring 14 so as to closely interpose the aluminum ring 14 therebetween. Each permanent magnet member 14 is provided with projections 15 projecting from an inner wall surface thereof for preventing rotation thereof relative to the lead screw 2, and is magnetized in alternating magnetic poles. By offsetting the poles of one of the permanent magnets from those of the other permanent magnet, it is possible to increase or double the number of magnetic poles arranged along the circumference of the rotor 17. The permanent magnet members 16 are typically made of permanent magnet materials such as ferrite which is known to be brittle or has a low mechanical strength against tensile stress.

If desired, the aluminum ring 14 may be eliminated. In this case, the rotor 17 may consist of a single solid annular permanent magnet magnetized in alternating magnetic poles along its circumference.

Figure 11:
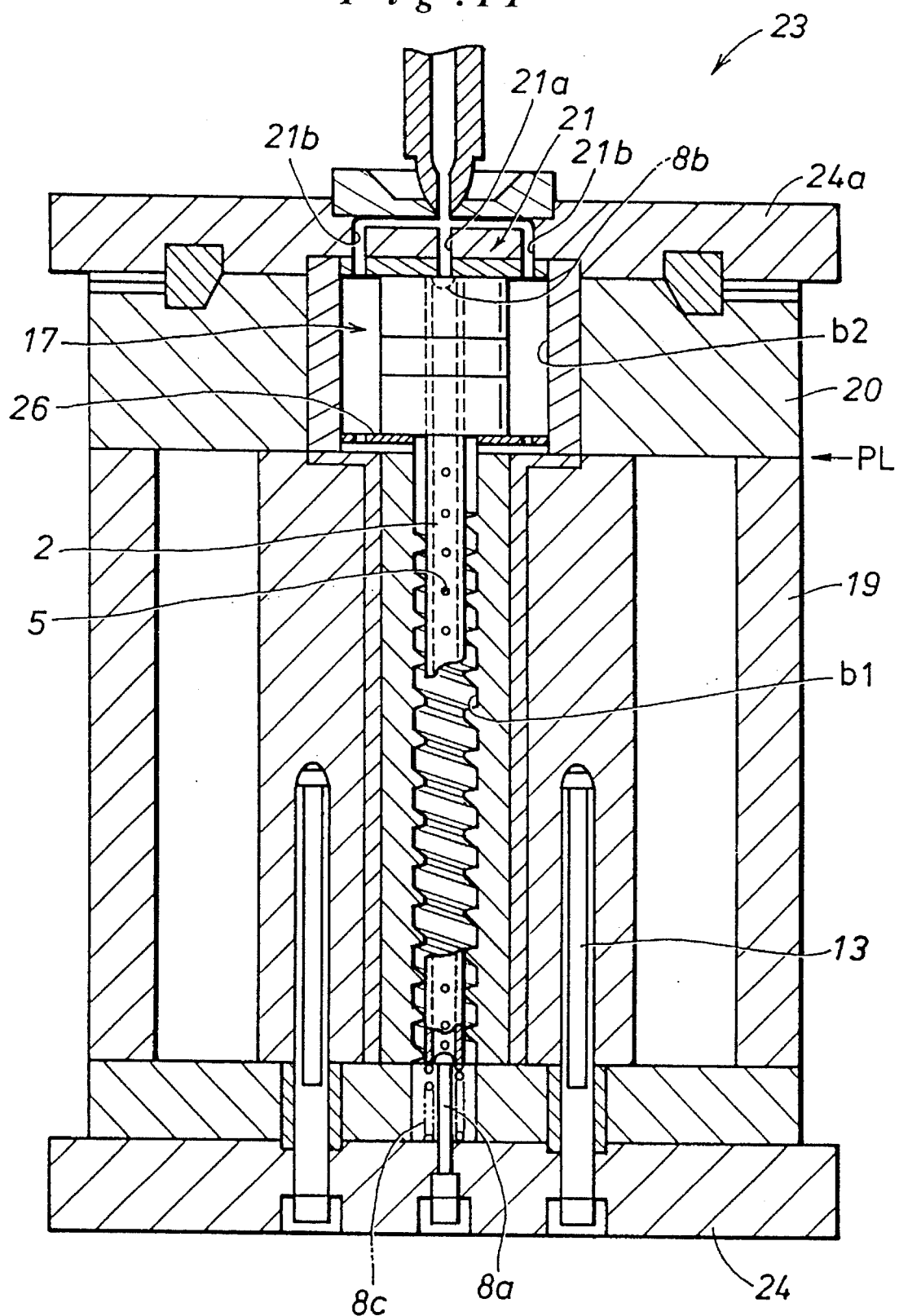
FIG. 11 is a view similar to FIG. 6 showing an essential part of the molding die assembly for fabricating the lead screw illustrated in FIGS. 8 through 10 by the method of the present invention.
Figure 12:
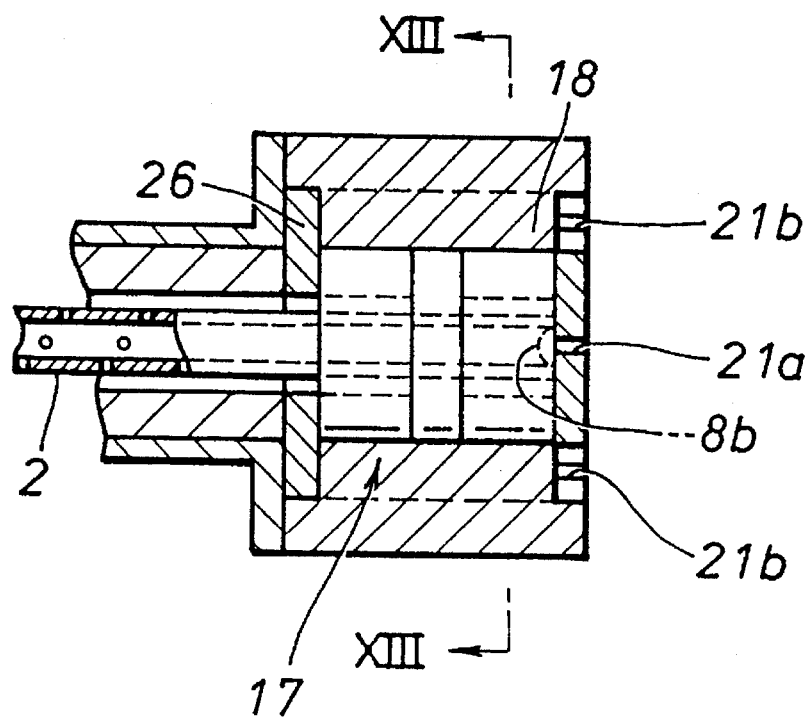
FIG. 12 is a sectional view taken along line XII—XII of FIG. 13.
Figure 13:
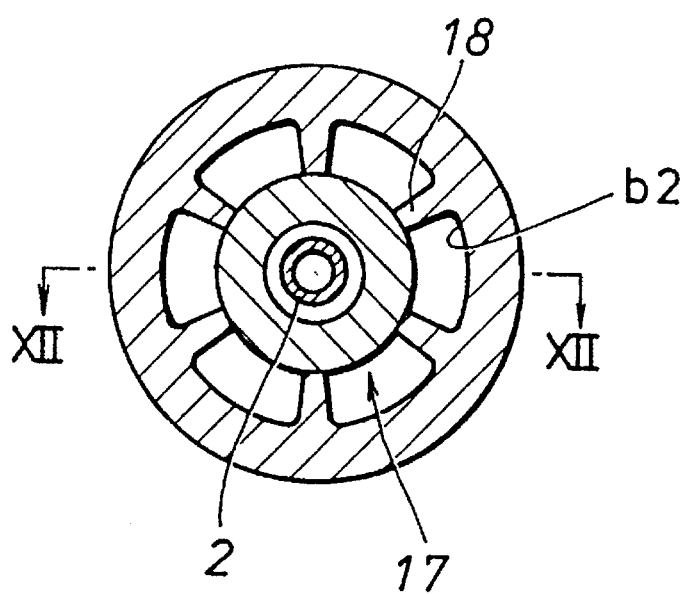
FIG. 13 is a sectional view taken along line XIII—XIII of FIG. 12.

FIGS. 11 through 13 illustrate the die assembly 23 for molding the lead screw provided with a rotor illustrated in FIGS. 8 through 10. In FIGS. 11, the parts corresponding to those of FIG. 5 are denoted with like numerals.

This die assembly 23 comprises an upper die 20 for molding the base end portion 1a of the lead screw along with the rotor 17, and a lower die 19 for molding the free end portion 1b provided with a screw thread crest 4. The lower die 19 is provided with a cavity b1 defining a thread groove 4a for molding the thread crest 4 corresponding to the array of holes 5a formed in the tube 2. The upper die 20 is provided with a cavity b2 consisting of a plurality of sectors separated by a plurality of radial ribs 18 (FIGS. 12 and 13) thereof having free ends abutting the outer circumferential surface of the rotor 17. The lower cavity b1 and the upper cavity b2 are disposed coaxial with each other, and communicate with each other when the lower die 19 and the upper die 20 are combined.

Before combining the lower and upper dies 19 and 20, the base end portion of the tube 2 and the rotor 17 are placed in the cavity b2 of the upper die 20 while the free end portion of the tube 2 is placed in the cavity b1 of the lower die 19 with the array of holes 5a formed in the tube 2 registered or matched in position with the thread groove 4a of the lower cavity b1. When the lower die 19 and the upper die 20 are combined, the free end of the tube 2 is positioned by a locating pin 8a or an ejector while the upper end of the tube 2 is positioned by a locating pin 8b and the rotor 17 positioned about the base end portion of the tube 2 is supported at the outer circumferential surface thereof by the radial ribs 18 of the upper cavity b2. FIG. 11 illustrates the die assembly with the core tube 2 and the rotor 17 positioned in the cavity, and the synthetic resin material is yet to be injected.

The synthetic resin material is injected into the upper cavity b2 from a gate 21 provided at an upper axial end of the upper cavity b2. The gate 21 comprises a central inlet 21a which communicates with the interior of the core tube 2, and an outer inlet 21b consisting of a plurality of openings each of which opens into an associated one of the sectors of the upper cavity b2. The synthetic resin material is thus separated into two flows, one flowing into the interior of the core tube 2, and the other flowing into the annular gap surrounding the rotor 17. The first flow advances axially through the internal bore 10 of the core tube 2, and the second flow advances along the external surface of the core tube 2. These two flows eventually meet with each other either on the exterior of the core tube 2 or inside the internal bore 10 of the core tube 2. In either case, the synthetic resin material forming the thread crest 4 on the exterior of the core tube 2 is firmly rooted in the synthetic resin material inside the core tube 2 via the array of holes 5a, and is thereby securely attached to the core tube 2.

Figure 14:
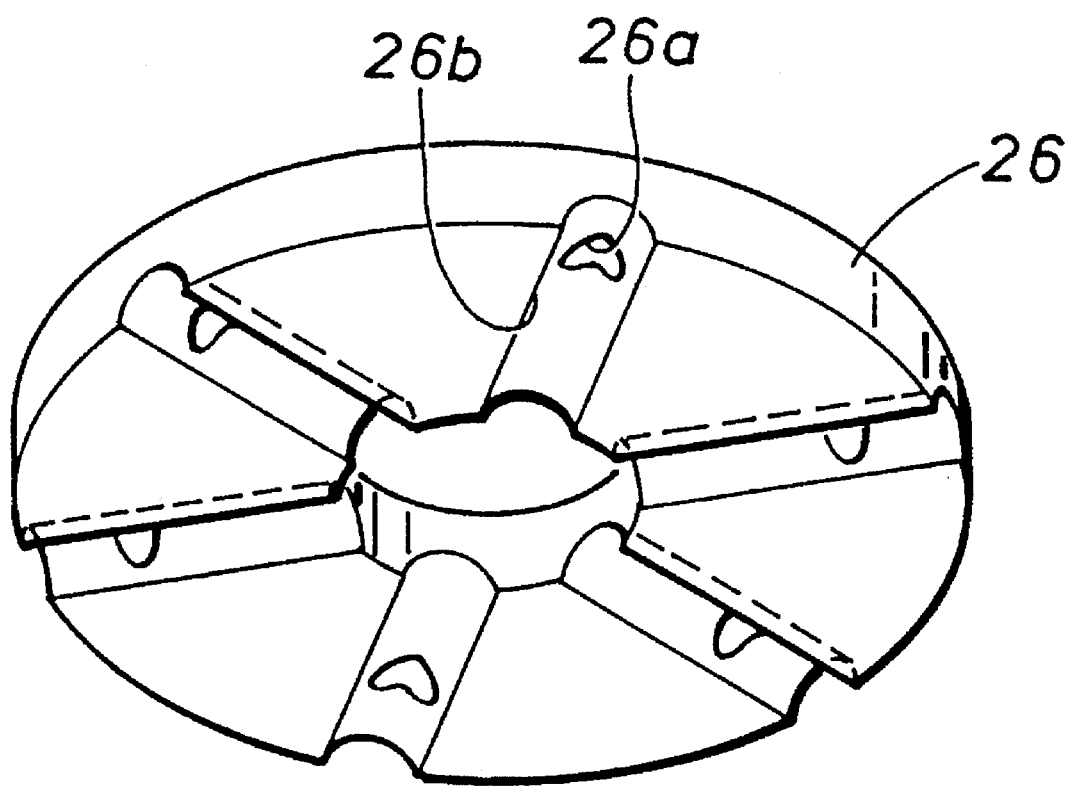
FIG. 14 is a perspective view of the insert member used in the die assemblies illustrated in FIGS. 11 and 15.

At the base end portion of the core tube 2, the synthetic resin material injected from the outer inlet 21b of the gate 21 is initially filled into each of the sectors of the upper cavity b2 separated by the radial ribs 18, and eventually entirely fills all the sectors of the upper cavity b2 surrounding the rotor 17. The synthetic resin material then flows into an annular gap defined around the core tube 2 in the lower cavity b1 and also into an annular gap defined between the rotor 17 and the core tube 2 in the upper cavity b2 via first orifices 26a and second orifices 26b, respectively, defined by an insert member 26 placed at a bottom end of the upper cavity b2. FIG. 14 shows an enlarged view of this insert member 26. Because the rotor 17 receives an external pressure from the synthetic resin material filled into the upper cavity b2 surrounding the rotor 17 before it is filled into the interior of the permanent magnet members 16 of the rotor 17 and applies internal pressure to the rotor 17, the permanent magnet members 16 are not subjected to any dominant internal pressure, and is thus prevented from breakage by virtue of the external pressure applied by the synthetic resin material filled into the sectors or the gap defined between the rotor 17 and the opposing die surface.

Figure 15:
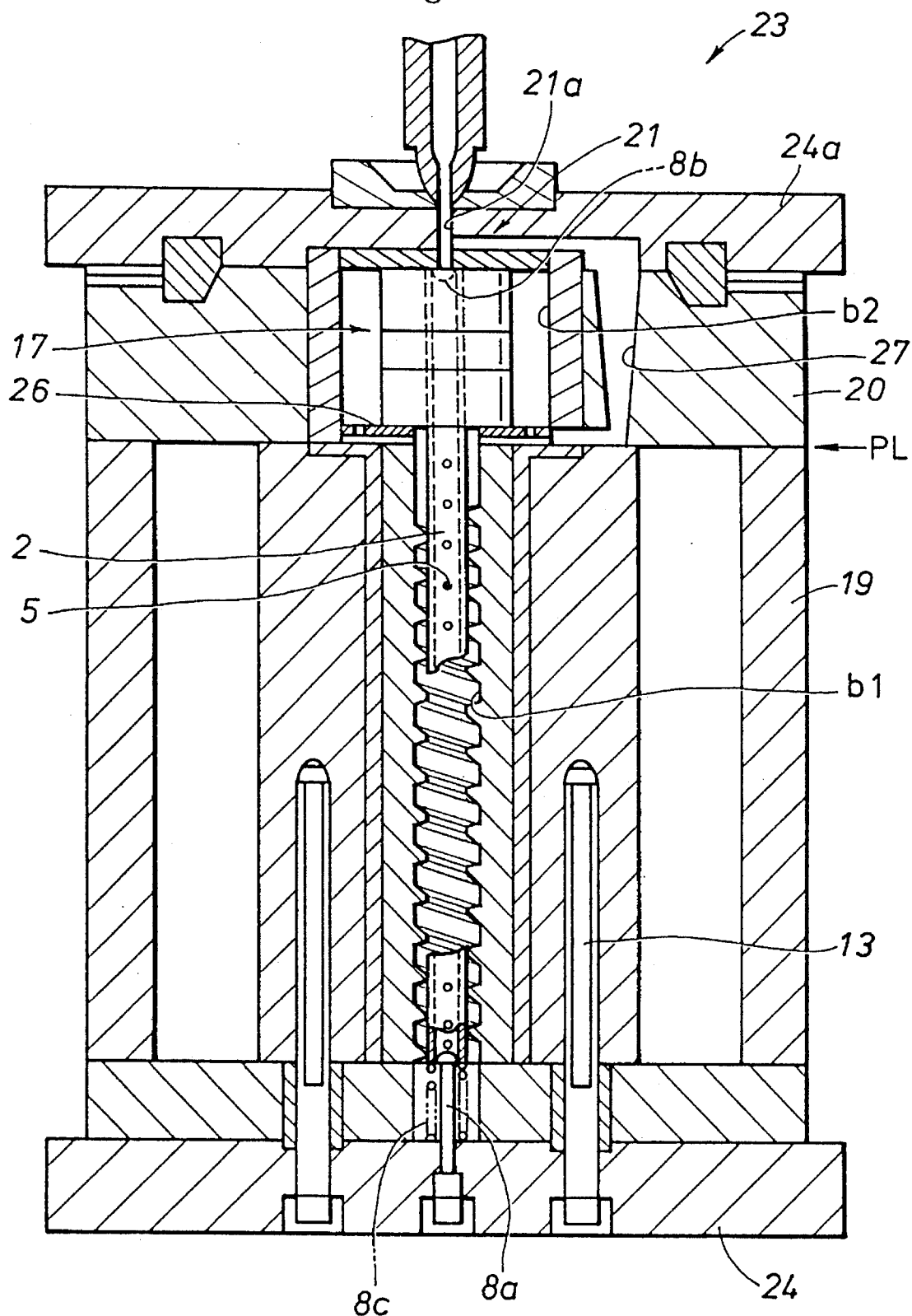
FIG. 15 is a view similar to FIG. 11 showing a embodiment slightly modified from that of FIG. 11.

FIG. 15 shows another embodiment of the die assembly 23. In FIG. 15, the parts corresponding to those in FIG. 11 are denoted with like numerals. In this embodiment, the gate 21 provided at the upper end of the upper cavity b2 is provided only with a central inlet 21a which is intended for injecting synthetic resin material into the interior of the core tube 2. The upper die 20 is additionally provided with a passage 27 extending from the gate 21 to the lower end of the upper cavity b2. Thus, part of the injected synthetic resin is conducted by the passage 27, and is filled into the annular gap defined in the upper cavity b2 between the outer circumferential surface of the rotor 17 and the opposing die surface via the first orifices 26a of the insert member 26, and is also filled into the annular gap defined between the core tube 2 and the opposing surface of the die surface in the lower cavity b1 as well as the annular gap defined in the upper cavity b2 between the outer surface of the core tube 2 and the inner circumferential surface of the rotor 17 via the second orifices 26b of the insert member 26. The annular gap around the core tube 2 extends into both the upper cavity b2 and the lower cavity b1, and the injected synthetic material flows along the outer surface of the core tube 2 upward in the upper cavity b2 and downward in the lower cavity b1. In this case also, because the rotor 17 receives an external pressure from the synthetic resin material filled into the part of the upper cavity b2 surrounding the rotor 17 before it is filled into the interior of the permanent magnet members 16 of the rotor 17 and applies internal pressure to the rotor 17, the permanent magnet members 16 are not subjected to any internal pressure, and is thus prevented from breakage by virtue of the external pressure applied by the synthetic resin material filled into the sectors or the gap defined between the rotor 17 and the opposing die surface.

Instead of the above described structure of the lower cavity b1 in which the cavity b1 is provided with a thread groove 4a for molding the thread crest 4 so as to correspond to the array of holes 5a provided in the other end of the tube 2, and the part of the outer circumferential surface of the tube 2 located between adjacent sections of the thread crest 4 is exposed, it is possible to adopt the following structure as an alternate embodiment.

To cover the part of the outer circumferential surface of the tube 2 located between adjacent sections of the thread crest 4 instead of exposing it, the cavity b1 of the lower die 19 may be formed with a gap between the die surface and the outer surface of the core tube at the root of the thread crest 4 so that the lead screw 1 may be molded integrally with the rotor 17 without exposing any part of the tube by combining the upper die 20 and the lower die 19 and injecting synthetic resin material therein as described above.

The die assemblies of the above described embodiments were constructed in such a manner that the object to be molded is vertically positioned during the molding process, but it is also possible to position the object to be molded laterally or even in a slanted orientation during the molding process when required. It is also possible to arrange a plurality of cavities side by side to mold a number of lead screws at the same time although it is not shown in the drawings.

The die assemblies according to the present invention illustrated in the appended drawings are constructed as consisting of a stationary lower die 6 or 19 and a moveable upper die 7 or 20 which are retained by associated die plates 24 and 24a, respectively, and are provided with a passage including a gate 9 or 21. The die assemblies are functionally connected with a die temperature control unit and a drive mechanism 13 so that the upper die 7 or 20 and the lower die 6 or 19 may functionally cooperate with each other.

The present invention having the above described structure offers the following advantages.

(a) Because the lead screw of the present invention comprises a core member consisting of a tube made of metal or the like, a thread crest made of synthetic resin material surrounds the metallic tube, and the thread crest is connected to the synthetic resin material filled in the central bore of the tube through the holes formed in the tube, the thread crest is firmly attached to the outer circumferential surface of the tube.

Therefore, the lead screw of the present invention is improved in its capability to withstand bending and tensile stresses, and is lighter in weight, lower in friction and better in electric insulation than a comparable lead screw made by machining a metallic rod or the like.

(b) Because the synthetic resin material is injected into the thread groove of the metallic die under a uniform internal pressure, and the thread crest thus formed is integrally connected to the synthetic resin material filled into the internal bore of the tube through the array of holes formed in the wall of the tube arranged along the thread groove, the inclined surface of the thread crest and the lead of the thread crest can be finished with a high precision, and a high level of reliability and precision can be achieved in converting the direction of motion.

(c) According to a certain aspect of the present invention, because the synthetic resin material covers the part of the outer circumferential surface of the tube located between adjacent sections of the thread crest, instead of exposing it, not only the capability to prevent rust and to achieve electric insulation can be improved but also such advantages as preventing generation of noises and ensuring the dimensional precision of the thread crest can be attained.

(d) According to another aspect of the present invention directed to a lead screw integrally provided with a rotor and a die assembly for carrying out this method, because the synthetic resin material is filled into the gap defined inside the annular permanent magnet members only after the cavity defined around the permanent magnet members is filled with the synthetic resin material, the breakage of the magnetic members during the process of molding can be avoided. Furthermore, because the rotor and the tube are integrally joined together, the subsequent fabrication process can be simplified, and the need for any subsequent work can be reduced. The present invention thus offers various industrial advantages such as an improved production efficiency and a reduced fabrication cost.

Although the present invention has been described in terms of specific embodiments thereof, it is possible to modify and alter details thereof without departing from the spirit of the present invention.

What we claim is:

1. A method for molding a lead screw comprising the steps of:

forming an array of holes in a wall of a core tube made of metal at portions matching in position with a thread crest of a prescribed screw thread;

preparing a die assembly provided with a cavity including a thread groove formed in a die surface thereof adapted to form said thread crest matching in position with said array of holes formed in said core tube;

placing said core tube in said cavity of said die assembly with said array of holes of said core tube matched in position with said thread groove of said cavity;

injecting synthetic resin material axially into an internal bore of said core tube as a first flow and into an annular gap defined between an outer circumferential surface of said core tube and said die surface of said cavity as a second flow; and removing the thus molded lead screw out of said die assembly.

2. A method for molding a lead screw according to claim 1, wherein distribution of synthetic resin material between said first flow directed axially into said internal bore of said core tube and said second flow directed axially along said outer circumferential surface of said core tube is determined in such a manner that said first and second flows meet with each other substantially inside said internal bore of said core tube.

3. A method for molding a lead screw according to claim 1, wherein part of said die surface located between adjacent sections of said thread groove is substantially in contact with an opposing outer circumferential surface of said core tube.

4. A method for molding a lead screw according to claim 1, wherein part of said die surface located between adjacent sections of said thread groove defines an annular gap with respect to an opposing outer circumferential surface of said core tube.

5. A method for molding a lead screw according to claim 1, wherein said step of removing said molded lead screw out of said die assembly includes the step of turning said molded lead screw relative to said die assembly around its axial line in a direction to unthread said lead screw out of said cavity.

6. A method for molding a lead screw provided with a rotor on a base end portion thereof comprising the steps of:

forming an array of holes in a wall of a core tube made of metal at portions matching in position with a thread crest of a prescribed screw thread;

preparing a die assembly provided with a first cavity including a thread groove formed in a die surface thereof adapted to form said thread crest matching in position with said array of holes formed in said core tube, and a second cavity for integrally molding an annular rotor on a base end portion of said core tube, said first and second cavities being arranged in a coaxial relationship, and communicating with each other;

placing said core tube and said annular rotor in said first and second cavities respectively such that said array of holes match the thread groove in said die assembly and so as to surround said base end portion of said core tube with a certain gap defined between said annular rotor and said core tube;

injecting synthetic resin material axially into an internal bore of said core tube as a first flow and into a first annular gap defined between an outer circumferential surface of said rotor and an opposing die surface of said die assembly, a second annular gap defined between an outer circumferential surface of said core tube and an inner circumferential surface of said rotor, and third annular gap defined between the outer circumferential surface of said core tube and the thread groove formed in said die assembly as a second flow, part of the second flow of said synthetic resin material flowing into said second and third annular gaps being controlled in such a manner that the pressure of said synthetic resin material filled into said first annular gap is substantially dominant over that filled into said second and third annular gaps; and removing the thus molded lead screw out of said die assembly.

7. A method for molding a lead screw according to claim 6, wherein distribution of synthetic resin material between said first flow and said second flow is determined in such a manner that said first and second flows meet with each other substantially inside said internal bore of said core tube.

8. A method for molding a lead screw according to claim 6, wherein part of said die surface located between adjacent sections of said thread groove is substantially in contact with an opposing outer circumferential surface of said core tube.

9. A method for molding a lead screw according to claim 6, wherein part of said die surface located between adjacent sections of said thread groove defines an annular gap with respect to an opposing outer circumferential surface of said core tube.

10. A method for molding a lead screw according to claim 6, wherein said step of removing said molded lead screw out of said die assembly includes the step of turning said molded lead screw relative to said die assembly around its axial line in a direction to unthread said lead screw out of said cavity.

* * * * *